United States Patent [19]

Gemignani

[11] 4,200,116
[45] Apr. 29, 1980

[54] DEVICE FOR SENSING PRESSURE AND GOVERNING THE OPERATION OF SAFETY VALVES

[76] Inventor: François Gemignani, 14 Lotissement du Pati, Martigues, Bouches-du-Rhone, France

[21] Appl. No.: 789,229

[22] Filed: Apr. 20, 1977

[30] Foreign Application Priority Data

Apr. 22, 1976 [FR] France .................................. 76 12833

[51] Int. Cl.² .......................................... F16K 31/122
[52] U.S. Cl. ............................... 137/492; 137/596.18; 137/596.2
[58] Field of Search ...................... 137/488, 492, 492.5, 137/596.18, 596.2, 102

[56] References Cited

U.S. PATENT DOCUMENTS

| | | | |
|---|---|---|---|
| 2,619,109 | 11/1952 | Garrett | 137/488 |
| 3,664,362 | 5/1976 | Weise | 137/488 X |
| 3,754,566 | 8/1973 | Gemignani | 137/488 |
| 3,977,423 | 8/1976 | Clayton | 137/488 X |

*Primary Examiner*—Alan Cohan
*Attorney, Agent, or Firm*—Karl F. Ross

[57] ABSTRACT

A control device for a fluid-operated safety valve of a boiler or the like comprises two chambers, each connected to the vessel to be protected and provided with respective valves. The first chamber is connected also to the cylinder of the safety valve via the first valve so that, when a pressure excess in the vessel develops the first chamber closes the connection between the vessel and the control cylinder while the second chamber vents the control cylinder to the atmosphere.

5 Claims, 11 Drawing Figures

DEVICE FOR SENSING PRESSURE AND GOVERNING THE OPERATION OF SAFETY VALVES

FIELD OF THE INVENTION

This invention relates to a device for sensing pressure and controlling the operation of safety valves.

BACKGROUND OF THE INVENTION

It is usual to equip apparatus under pressure such as boilers, with safety valves to avoid overpressures. The oldest and most rudimentary method of doing this consists in providing a safety valve formed by a valve member pressed against its seat by means of a calibrated spring, thus sealing the vessel to be protected. When the internal pressure of the vessel exceeds a predetermined value the valve member is lifted against the pressure of the spring. Such a method has the disadvantage that the valve rattles against its seating. Furthermore the valve member does not open completely, so that it produces a throttling effect on the fluid escaping from the vessel, resulting in erosion of the components. Because of rattling, the operation of such a valve is noisy. It is also to be noted that such valves require special maintenance, notably in relation to the biasing springs of the valve member which frequently require changing.

Another solution consists in associating the valve mounted on the vessel to be protected with an assembly comprising a cylinder within which is slidably mounted a piston having its rod fastened to the valve member. Said cylinder is in communication with the fluid contained in the vessel to be protected, a device for sensing the pressure and controlling the operation of the valve assembly being interposed in the communication duct.

OBJECT OF THE INVENTION

An object of the invention is to provide a sensing and controlling device as mentioned above, which is advantageous in that it can be located remote from the safety valve itself and causes the valve to open without throttling or rattling if need be.

SUMMARY OF THE INVENTION

To achieve this purpose, the device according to the invention comprises:

a first chamber connected to the vessel to be protected and to the cylinder that controls the safety valve, this said chamber being provided with a valve adapted to close the communication between the chamber and the cylinder; and a second chamber, which can be vented to the atmosphere by actuating a valve and opens into the communication duct between the first chamber and the control cylinder, the valves of both chambers being associated with respective actuation means controlled by the fluid of the vessel to be protected and being actuated in such manner that below a given pressure value the first chamber connects the vessel to be protected to the safety valve control cylinder while the second chamber is not vented to atmosphere, and above a given pressure value the first chamber closes the communication between said vessel and the control cylinder while venting the cylinder to the atmosphere through the second chamber.

Thanks to this arrangement, it is possible to vary the difference between the opening and closing pressures of the safety valve.

BRIEF DESCRIPTION OF THE DRAWING

Two embodiments of the invention will now be described with reference to the accompanying drawing in which.

SPECIFIC DESCRIPTION

Figure 1:
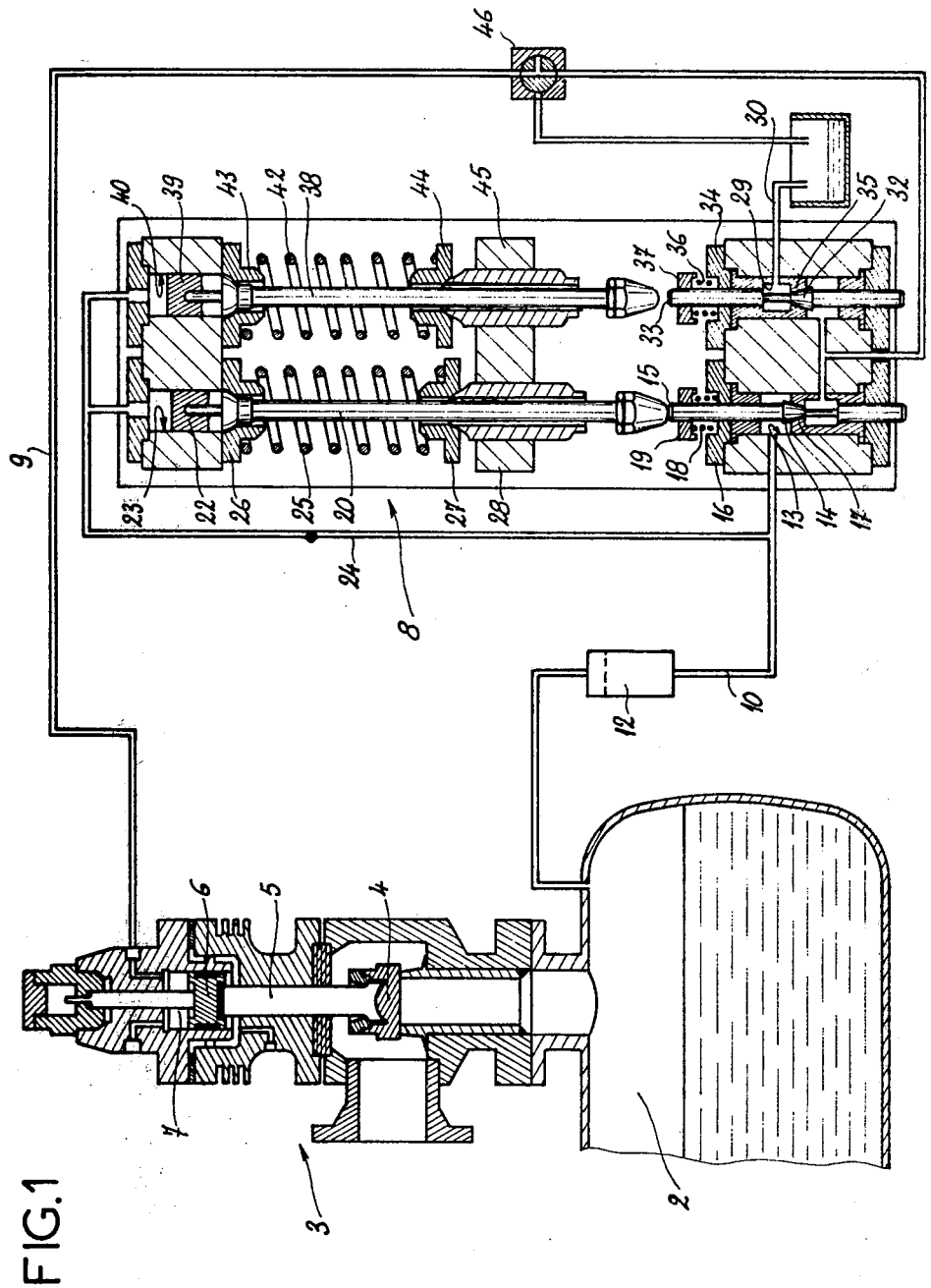
FIG. 1 is a sectional view of a first embodiment of the device according to the invention associated with a safety valve fitted to a boiler.

The drawings show a vessel 2 to be protected, e.g. a boiler provided with a safety valve assembly 3, comprising a valve member 4 fastened to the end of the rod 5 of a piston 6 sliding in a cylinder 7. The arrangement illustrated in the drawings includes also a device 8 for sensing the pressure and controlling the operation of the safety valve which is connected on one hand to the cylinder 7 by a duct 9 and, on the other hand, to the vessel itself by a duct 10, in which a buffer reservoir 12 is interposed to prevent the fluid contained in vessel 2 from flowing through the device 8.

The device 8 represented in FIGS. 1 to 5 comprises a first chamber 13 into which ducts 9 and 10 both open. This chamber 13 is therefore adapted to act as a communication means between vessel 2 and the cylinder 7 of safety valve assembly 3. A valve member 14 is adapted to close said communication. It is fastened to the end of a stem 15 sliding through a fixed component 16. It should be noted that the seat 17 of the valve member 14 is located on the side remote from the stem free end. The valve member 14 is normally lifted from its seat 17 by the action of a spring 18 acting on one hand on the fixed component 16 and on the other hand on a small flange 19 locked in position on stem 15 but axially adjustable along it.

The valve member 14 can be actuated via its stem 15 by the pressure exerted on the latter by the rod 20 of a piston 22 sliding within a cylinder 23. A duct 24 branched on pipe 10 opens into this cylinder 23. The displacement of piston 22 under the pressure in cylinder 23 is opposed by the pressure of a helical spring 25 acting on a small flange 26 secured to the rod 20 close to the piston 22 and, also acting on a further small flange 27—through which rod 20 can slide—the flange 27 being adjustably mounted on a support 28.

The device 8 also comprises a second chamber 29 into which open on one hand the duct 9 and on the other hand a discharge pipe 30. A valve member 32 associated with the chamber 29 is adapted to close the communication between duct 9 and discharge pipe 30. The valve member 32 is secured to a stem 33 sliding through a fixed component 34. The seat 35 of valve member 32 is located on the side of said valve member closer to the free end of stem 33. Valve member 32 is normally kept pressed against its seat 35 by the force of a spring 36 acting on one hand against the fixed component 34 and on the other hand against a small flange 37 which is axially adjustable along the stem 33 and adapted to be locked in the desired position on said stem.

The valve member 32 can be actuated via its stem 33 by the pressure exerted on the latter by the rod 38 of a piston 39 sliding within a cylinder 40. A pipe branched on duct 24 opens into said cylinder 40. The displacement of piston 39 is opposed by the force of a helical spring 42 acting on one hand on a small flange 43 secured to rod 38 and on the other hand on another small flange 44, through which rod 38 slides. Said flange 44 is mounted on a fixed component 45 but is adjustable relative to the latter in the direction of rod 38.

A three-way cock 46 is also provided in duct 9; it is adapted to connect cylinder 7 to the discharge should there be need, whatever the pressure may be in the vessel to be protected, and therefore can be used as a discharge cock or as a regulating cock.

Figure 6:
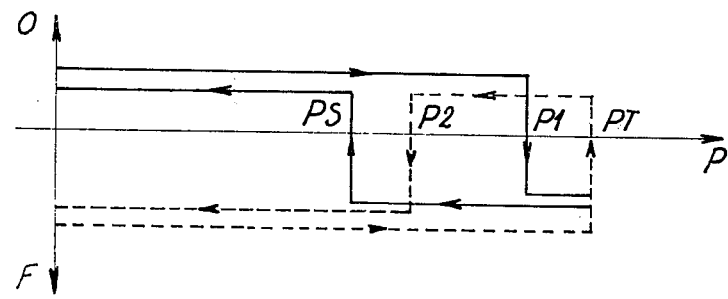
FIG. 6 is a diagram showing the operation of the device relative to the internal pressure of the vessel to be protected.
Figure 7:
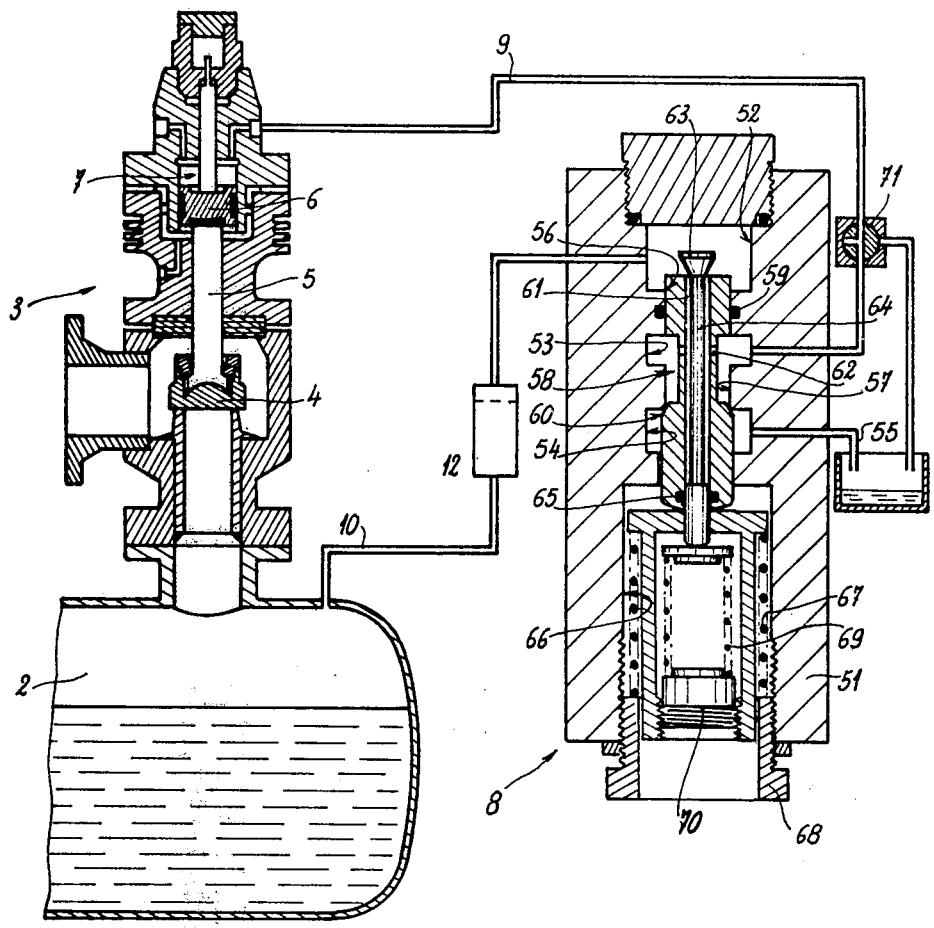
FIG. 7 is a sectional view of a second embodiment of the device according to the invention associated with a valve fitted to a boiler.

FIG. 6 is a diagram in which abscissae and ordinates respectively indicate the pressures, and the opening ("O") and closing ("F") positions of valves members 14 and 32. The operating cycle of the valve member 14 is represented as a solid line while that of valve member 32 is represented as a broken line.

Figure 2:
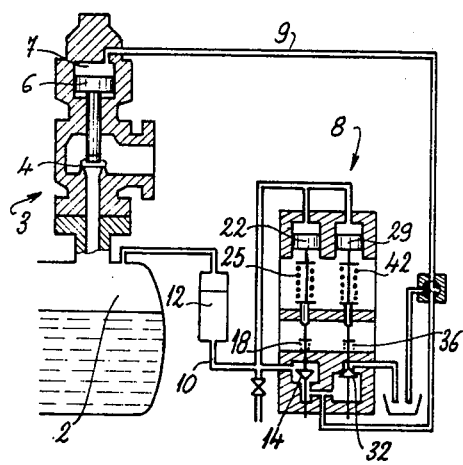
FIGS. 2 to 5 are four very schematic sectional views of the arrangement of FIG. 1, corresponding to four stages of operation.
Figure 3:
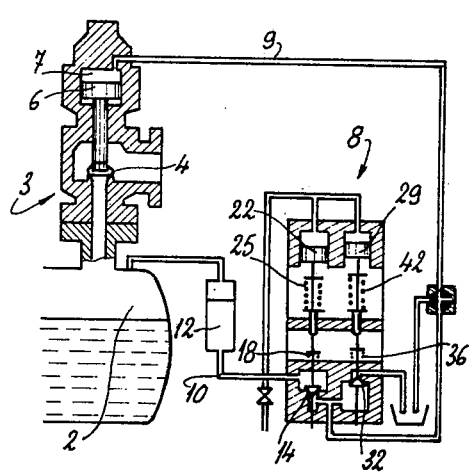
Figure 4:
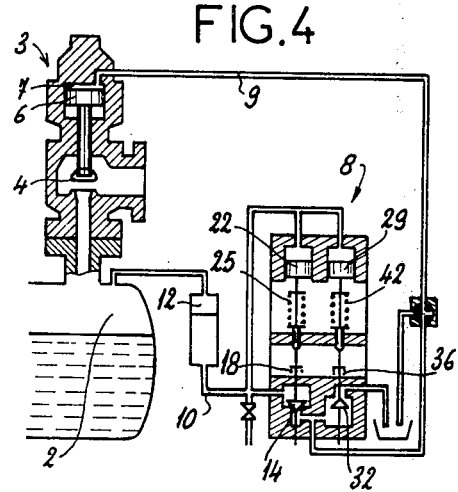
Figure 5:
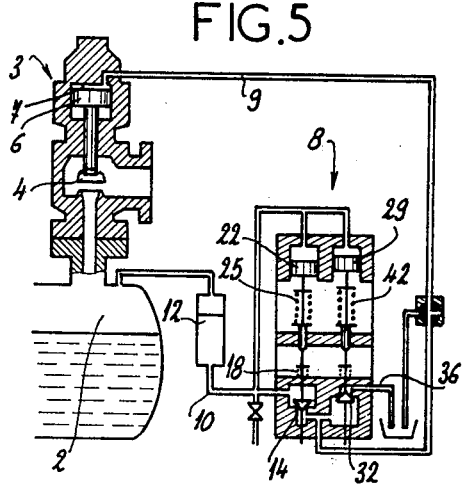

When the pressure inside the vessel to be protected is less than a predetermined value P1, the forces developed by springs 25 and 42 respectively are greater than the force exerted by fluid on pistons 22 and 39. The corresponding rods 20 and 38 are lifted away from stems 15 and 33 of valves members 14 and 32 respectively, the positions of the latter being determined by the action of springs 18 and 36 respectively. As shown in FIG. 2, valve member 14 is open and valve member 32 is closed. The pressure in cylinder 7 therefore corresponds to the pressure in vessel 2, and the safety valve assembly 3 is closed.

When the pressure in the vessel 2 reaches the value P1, because of the calibration of spring 25, a displacement of piston 22, rod 20 and also of stem 15 against the action of spring 18 takes place, pressing the valve member 14 against its seat 17. The communication between the vessel 2 and the cylinder 7 is therefore cut off. Still, since valve member 32 remains in its closed position, pressure in cylinder 7 is kept and the safety valve assembly remains closed. When the pressure in the vessel reaches a greater value PT corresponding to the calibration pressure, on account of the calibration of the spring 42, piston 39 and rod 38 are displaced, the latter acts on stem 33 which causes valve member 32 to open against the action of spring 36. The cylinder 7 is therefore vented to atmosphere. As no pressure is acting on piston 6, the safety valve member 4 lifts considerably and allows a reduction of pressure in vessel 2.

When the pressure in the vessel has reduced and reached a value P2 the action of springs 42 and 36 is greater than the force exerted by the fluid on piston 39, causing piston-rod-stem assembly to be displaced upwards, whereby closing valve member 32. The valve member 14 remains in closed position. As the pressure in vessel 2 continues to fall, and reaches again working pressure level PS, the force exerted on piston 22 is no longer sufficient to resist the action of springs 18 and 25. The valve member 14 therefore opens, connecting the vessel with cylinder 7. Because of the pressure exerted on piston 6, the main valve member 4 is pressed against its seat once more.

The device 8 represented in FIGS. 7 to 11 comprises three coaxial chambers 52, 53 and 54 respectively, arranged in a body 51, the first of which, 52, is connected by duct 10 to the vessel 2, the second, 53, is connected by duct 9 to the cylinder 7, and the third, 54, is vented to the atmosphere through a pipe 55. These three chambers communicate with one another by means of two coaxial bores 56 and 57. Bore 56 between chambers 52 and 53, and bore 57 communicates between chambers 53 and 54. A member 58 is slidingly mounted in said bores. Said member slides sealingly within the bore 56, a sealing ring 59 being provided for that purpose.

The member 58 acts also as a shut off valve between chambers 53 and 54, a frustoconical portion 60 thereof being adapted to be pressed against a seat formed at one end of bore 57. The sliding member 58 is also formed with a central axial bore 61 opening into chamber 52 and providing a connection between chambers 52 and 53 through radial holes 62. A frustoconical valve member 63 is associated with bore 61 and is located inside chamber 52. The valve member 63 is integral with a stem 64, having a cross-section smaller than that of bore 61 and extending through the whole length thereof, a seal ring 65 being provided to ensure pressure-tightness between stem 64 and member 58 at the end portion thereof remote from chamber 52.

The end of the sliding member 58 remote from chamber 52 projects into a bore 66 accommodating a helical spring 67 bearing at one end on member 58, at the other end on a threaded plug 68 adjustably screwed into the body 51 of the device. The free end of stem 64 bears on one end of a helical spring 69, the other end of which bears on a threaded plug 70 screw into the interior of a socket formed as an extension of a member interposed between sliding member 58 and spring 67.

It should be noted that a three-way cock 71 is provided in duct 9, allowing cylinder 7 to be manually vented to atmosphere should there be need, so that it can be used either as a discharge cock or as a regulating cock.

It is clear from the construction of this device, that the springs 67 and 69 acting on valves 60 and 63 respectively, have an effect opposite to that created in chamber 52 by the pressure existing in the vessel 2. FIG. 6 is a diagram in which pressures are shown as abscissae and opening and closing positions of valves members 63 and 60 are shown as ordinates. The operating cycle of valve member 63 is represented as a solid line while that of valve member 60 is represented as a broken line.

Figure 8:
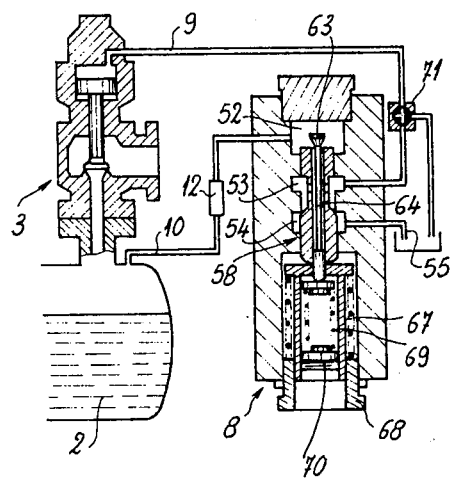
FIGS. 8 to 11 are four very schematic sectional views of the arrangement of FIG. 7 corresponding to four distinct stages of operation.

When the pressure inside the vessel 2 is less than a predetermined value P1, the force developed by springs 67 and 69 is such that valve member 63 is open and the pressure in the cylinder 7 corresponds to that in the vessel 2. This position is shown in FIG. 8.

Figure 9:
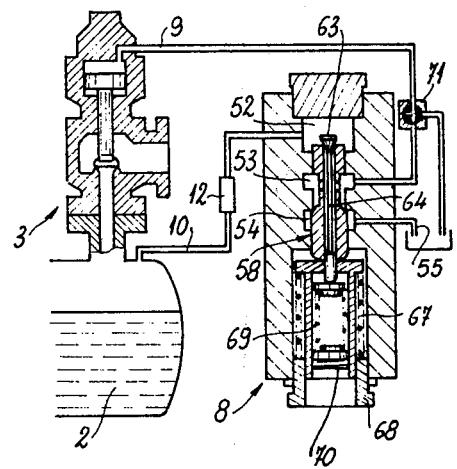

When the pressure in the vessel reaches a value P1, on account of the calibration of spring 69 a downwards displacement of the stem 64 and consequently of valve member 63 takes place, causing the latter to close. Therefore all communication between vessel 2 and cylinder 7 is cut off. Still, since valve member 60 remains in its closed position, pressure is maintained in the cylinder 7 so that the safety valve member 4 remains closed, as shown in FIG. 9.

Figure 10:
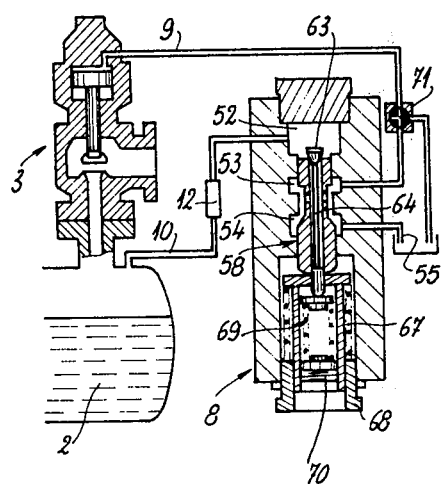

When the pressure in the vessel 2 continues to increase and reaches the value PT, the whole of sliding member 58 by reason of the calibration of spring 69, is displaced downwards, causing valve member 60 to open. The cylinder 7 is then vented to the atmosphere and, as no pressure is acting on piston 6, the safety valve member 4 lifts significantly and allows a reduction of pressure in vessel 2, as shown in FIG. 10.

Figure 11:
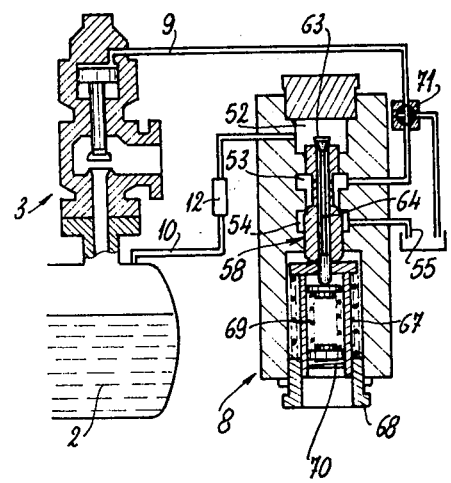

When the pressure in the vessel has reduced and reached a value P2, the action of springs 67 and 69 is sufficient to cause member 58 to move upwards, causing valve member 60 to close, while valve member 63 remains closed as shown in FIG. 11.

As the pressure in the vessel 2 continues to fall, and reaches working pressure level PS once more, the force exerted on valve member 63 is no longer sufficient to resist the extension of spring 69, and valve member 63 therefore opens, putting the vessel into communication with cylinder 7. The safety-valve member 4 is pressed against its seating once more because of the pressure exerted on piston 6.

The above described cycle starts again in so far as a new rise in pressure has occurred. It should be noted that the actuating pressures can be controlled by modifying the calibrations of the springs. Also the values of the pressure ranges PS-P1 and PT-P2, which depend on the unbalance between valves members 14 and 32 can be shifted with respect to one another. These features give the valve assembly a large number of possible applications as well as an operation extremely close to the maximum calculated pressure.

The accuracy of opening and closing that it is possible to obtain with such a valve assembly is of the order of 0.5 bar.

Such an arrangement offers the following advantages:

the safety-valve member does not "rattle" against its seating, the opening and closing are silent, the losses of products by leakage are suppressed, the whole assembly can operate in a corrosive environment, the device of the invention is insensitive to back-pressure, it does not require any special maintenance, and the possibility of locating the pressure sensing and safety-valve governing unit remote from the vessel avoids dangerous maintenance work on the spot and permits remote re-calibration.

I claim:

1. A safety valve system for a pressure vessel comprising in combination:
    a safety valve mounted on said vessel and including:
        a valve member engageable with a seat to close said vessel and openable to relieve pressure therein,
        a piston rod connected to said valve member,
        a valve piston connected with said piston rod, and
        a main cylinder receiving said valve piston and pressurizable to bias said valve piston in a direction maintaining said vessel closed;
    a pressure-sensing and valve controlling device spaced from said safety valve and from said vessel, said device comprising:
        a control-valve body spaced from said vessel and from said safety valve,
        a first chamber formed in said body and connectible to said vessel and to said main cylinder, said first chamber being provided with a first control valve adapted to close communication between said first chamber and said main cylinder,
        a second chamber formed in said body, connected to the atmosphere and to both said first chamber and said main cylinder at a connection in said body, said second chamber being provided with a second control valve adapted to close communication between said first chamber and main cylinder on the one hand and the atmosphere on the other hand,
        respective control rods positioned to act upon said control valves,
        respective control pistons operatively connected to said control valves,
        respective control cylinders receiving said control pistons and connectible to said vessel for pressurization thereby to bias said control piston in directions in which said control pistons maintain said first control valve closed and open said second control valve, and
        respective springs acting upon said control rods so that below a given pressure value in said vessel said first control valve is open to connect said first chamber to said main cylinder while said second control valve is closed and above a given pressure value in said vessel said first control valve is closed while said control valve is opened to vent said main cylinder to the atmosphere through said second chamber; and respective conduits connecting:
            said main cylinder to said chambers at said connection,
            said control cylinders to said vessel, and
            said vessel to said first chamber.

2. The combination defined in claim 1 further comprising a respective additional spring acting on said first and second control valves for respectively biasing same into open and closed positions.

3. The combination defined in claim 2 wherein said controls valves, control rods springs and control pistons are disposed adjacent one another and in mutually parallel relationship.

4. The combination defined in claim 2 further comprising a buffer reservoir between said vessel and said first chamber and between said vessel and said control cylinder.

5. The combination defined in claim 1 further comprising a two-position valve in the conduit means between said connection and said main cylinder for venting same in one position of this valve.

* * * * *